Figure 1:
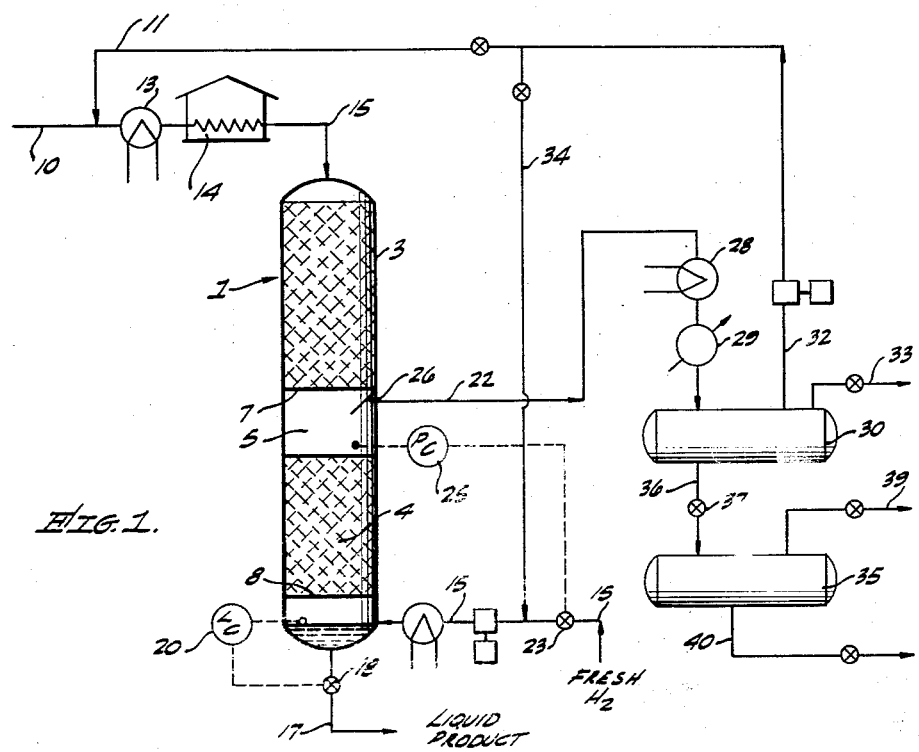

INVENTORS.
ARNOLD E. KELLEY,
ROLAND F. DEERING,
BY
James S. Henderson
AGENT.

United States Patent Office 2,952,626
Patented Sept. 13, 1960

2,952,626

MIXED-PHASE HYDROFINING OF HYDRO-CARBON OILS

Arnold E. Kelley, Fullerton, and Roland F. Deering, Whittier, Calif., assignors to Union Oil Company of California, Los Angeles, Calif., a corporation of California Filed Aug. 5, 1957, Ser. No. 676,231

10 Claims. (Cl. 208—210)

This invention relates to the catalytic hydrofining of mineral oils wherein the conditions of treatment are such that a portion of the feed is in the liquid phase, and another portion is in the vapor phase during hydrofining. More specifically, the invention is concerned with means for increasing the degree of hydrofining of the liquid fraction relative to that of the light fraction, but without necessarily increasing the severity of the processing with respect to the vapor-phase fraction.

The gist of the invention consists in first subjecting the total feed to mixed-phase hydrofining in a first catalytic hydrofining zone, then effecting a separation of the liquid phase from the gas phase, said separation being performed at essentially the pressure prevailing in the first reactor, and then transferring the separated liquid phase to a second catalytic hydrofining zone for further treatment to remove more completely the remaining sulfur and nitrogen compounds. In the second hydrofining zone, the liquid feed flows downwardly through the catalyst bed countercurrently to a stream of hydrogen. Preferably the hydrogen for the second hydrofining zone comprises all of the fresh makeup hydrogen required for the entire system. This gas stream supplies the necessary hydrogen for the liquid-phase hydrofining, and in addition acts as a stripping agent to remove light hydrocarbons from the liquid-phase feed. After rising countercurrently through the liquid-phase hydrofiner, the stripping gas stream is mingled with the vapor-phase product from the first hydrofining zone, and the combined gas phase is then condensed to recover a light hydrocarbon fraction and a recycle hydrogen stream. The hydrogen so recovered is then recycled either in whole or in part to the first hydrofining zone; any hydrogen not recycled to the first hydrofining zone is mingled with the makeup hydrogen supplied to the second hydrofining zone.

In one modification of the invention, the total effluent from the first hydrofining zone is partially cooled prior to separating the liquid phase from the gas phase. In this manner part of the gaseous products are condensed, and control may be maintained over the boiling range of the liquid-phase product which is to be further treated in the second hydrofining zone.

One of the principal objects of the invention is to provide simple and economical methods for the controlled catalytic hydrofining of wide-boiling-range feedstocks. A more specific object is to provide convenient and inexpensive methods for subjecting a selected heavy fraction of a given feed to a more extended hydrofining treatment than the remaining light fraction. Another object is to provide optimum catalysts and conditions for liquid-phase hydrofining. Still another object is to provide for the most efficient possible utilization of catalyst where it is desired to increase the degree of hydrofining of that portion of feed which passes through a mixed-phase hydrofiner in the liquid phase. Another object is to provide novel combinations of apparatus for effecting the herein described hydrofining treatments. Other objects and advantages will be apparent from the more detailed description which follows.

The term "hydrofining" as used herein means the selective hydrocracking of hydrocarbon feedstocks contaminated with various organic impurities such as sulfur compounds, nitrogen compounds, and oxygen compounds, with resultant chemical consumption of hydrogen. The catalysts used, and the reaction conditions are chosen so as to effect a selective hydrogenation and decomposition of the sulfur, nitrogen, and oxygen compounds, without causing any appreciable hydrocracking of the hydrocarbon components. Such hydrofining processes have become widely used for refining selected feedstocks, e.g. gasolines, heavy gas oils, light gas oils, kerosene, solvent naphthas, and the like. In these known processes, the feed is admixed with e.g. 300–5000 s.c.f. of hydrogen per barrel of feed, preheated to a temperature of about 650°–875° F., and then passed through a bed of the desired catalyst. Pressures of about 300 to 5000 p.s.i.g. are normally employed, along with feed rates amounting to about 0.5 to 15 volumes of feed per volume of catalyst per hour.

Under the foregoing processing conditions, the light feeds such as gasoline are normally present wholly, or almost wholly, in the vapor phase. Heavier materials such as gas oils are normally present both in the liquid and the vapor phase.

The present invention is concerned especially with the problems which arise when such heavy feeds are employed that a considerable proportion thereof, e.g. 40% to 90%, would normally be present in the liquid phase, the remainder going through as vapor.

Where a liquid phase is present it will form a liquid film covering the entire active catalyst surface. Consequently, the feed which remains in the gas phase can react only by diffusion through the liquid film on the catalyst. This inherently retards the conversion rate of the gas-phase portion. However, when the liquid-phase portion is a relatively large part of the total feed, and where both phases are flowing concurrently downwardly through the catalyst bed, the residence time of the liquid-phase portion necessarily becomes small, as compared to the situation when the liquid phase is a small fraction of the total. Under the former condition, the degree of conversion of the liquid phase may be considerably less than that of the vapor phase, notwithstanding that the vapor phase reaction is retarded by the liquid film on the catalyst.

Another factor to be considered is that where a large part of the feed is initially in the liquid phase, a considerable portion of the gaseous product resulting from mixed-phase hydrofining will normally arise during such hydrofining. The sulfur, nitrogen and oxygen compounds in the feed are decomposed to form hydrogen sulfide, ammonia, water, and hydrocarbon fragments. These hydrocarbon fragments are normally of relatively low molecular weight and hence will form a considerable portion of the vapor-phase product which is produced. Moreover, a small portion of the hydrocarbons themselves will be hydrocracked to produce low-boiling hydrocarbons. This incremental vapor phase produced during hydrofining will obviously be relatively free of organic sulfur and nitrogen compounds. This factor hence tends to increase the purity of the vapor-phase product relative to that of the remaining liquid-phase product. Hence, for all the foregoing reasons, and to avoid yield losses inherent in the overtreatment of sufficiently purified fractions, it often becomes desirable to subject the liquid-phase product to further hydrofining in the absence of the vapor phase. This condition obtains when the mixed-phase hydrofining has been carried to the extent desired for the vapor phase, but not for the liquid phase.

The process of this invention is useful for example when it is desired to hydrofine heavy gas oils having an initial boiling point above about 500° F. In using such feedstocks, only a minor portion, e.g. 20–40%, will normally be initially in the vapor phase. This small portion of vapor phase will become effectively hydrofined before the liquid phase can be sufficiently treated in a conventional downflow reactor. In still other instances, product specifications may permit higher sulfur contents in a given light fraction of feed than is desired in the heavy fraction. In these instances, the process may be useful regardless of the proportion of feed which passes through in the liquid phase. An example of such utility may occur for example when a 400°–800° F. boiling-range gas oil is to be treated for maximum sulfur removal of the 450°–800° F. fraction, while the 100°–450° F. gasoline fraction produced is to be sent to pre-existing facilities for further sulfur removal, etc.

In still other instances, the product specifications for the light and heavy fractions may be substantially the same in terms of sulfur and nitrogen content. However, where only a small part of the charge is in the vapor phase, e.g. 5–30%, it may become sufficiently hydrofined before product specifications are met on the liquid-phase portion, due to the differential conversion rates discussed above. It would be disadvantageous to increase the overall severity of treatment to obtain the desired liquid phase conversion, because this would involve overtreatment of the vapor-phase portion with resultant losses in product yield and increased rates of catalyst deactivation resulting from gum and coke deposits. Hence, the two-stage hydrofining of this invention may be useful even where a single ultimate product is desired.

It will hence be apparent that the process of this invention is useful wherever it is desired to hydrofine a charge stock in a single treating unit under conditions where part of the charge is normally liquid and part is gaseous, and wherein it is desired that a heavy portion of the charge be subjected to additional hydrofining in the absence of the light portion.

Feedstocks which may be treated herein include in general any mineral oil stock having an end boiling point in excess of about 500° F. and an initial boiling point at least about 75° F. lower than the end boiling point. When using stocks of this type, it is almost inevitable that the heavy ends will constitute a relatively fixed and unchanging liquid phase during hydrofining, while the light ends will undergo treatment predominantly in the vapor phase. Specific examples of such stocks include crude oils, reduced crude oils, deasphalted reduced crude oils, light gas oils, heavy gas oils, kerosene-gas oil fractions, heavy naphtha-gas oil fractions, fuel oil fractions, etc. These stocks may be derived from petroleum, shale, tar sands and similar natural deposits.

Figure 2:
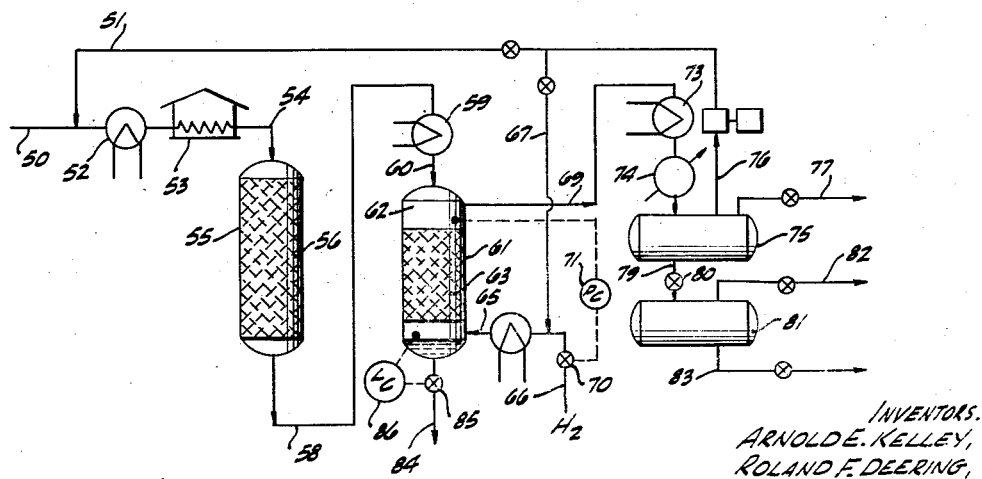

Operation of the process may be more readily understood with reference to the accompanying drawing. Figure 1 is a schematic flow diagram illustrating one modification, and Figure 2 is a schematic flow diagram illustrating a slightly different modification. Neither of these illustrations however is intended to be limiting in scope.

In Figure 1 the principal piece of apparatus consists of a dual-bed catalytic reactor 1, wherein the two catalyst beds 3 and 4 are separated by an intervening gas-liquid separation zone 5. Reactor 1 is a cylindrical column constructed of steel or iron, or other suitable pressure-retaining metal which will withstand corrosion and temperatures up to about 1000° F. Such apparatus units are conventional and hence need not be described in detail.

Upper catalyst bed 3 is supported on a perforated supporting plate 7, and lower catalyst bed 4 is supported on a second perforated plate 8. In operation, the initial feed is pumped in through line 10 where it mingles with recycle hydrogen from line 11. The mixture is then pumped through heat exchanger 13, final preheater 14, line 15, and into the top of reactor 1. The mixture then flows downwardly through catalyst bed 3, and is discharged into separation zone 5. The liquid portion of feed continues to flow by gravity through lower catalyst bed 4, countercurrently to a stream of preheated hydrogen pumped in via line 15 just below supporting plate 8. The rate at which fresh hydrogen is admitted is controlled by valve 23 in response to pressure controller 25, whereby a constant pressure is maintained in reactor 1. In flowing through catalyst bed 4, the hydrogen strips out light hydrocarbons, both those initially dissolved in the liquid and those produced in zone 4 as a result of hydrofining reactions.

The liquid product from catalyst zone 4 accumulates in the bottom of reactor 1, and is withdrawn via line 17 by means of valve 18 operated by liquid-level controller 20. This liquid product is then sent to final fractionating and finishing units not shown.

The vapor-phase product from catalyst zone 3, in admixture with the vapor-phase stream from catalyst zone 4, is withdrawn via line 22. A segmental deflector plate 26, welded to the inner surface of reactor shell 1, and sloping downwardly over vapor outlet line 22, serves to deflect liquid product away from vapor outlet line 22 and prevents entrainment of liquid in the withdrawn gases.

The vapor-phase product in line 22 is then passed through pre-cooler 28 in heat-exchange relation with cool feed or other cool product stream, and then passes through condenser 29 and into high-pressure separator 30, which is maintained at substantially the same pressure as reactor 1. Recycle gases are removed from separator 30 via line 32 and passed, either in whole or in part via line 11 to mingle with fresh feed in line 10. Another portion of the recycle gases may be passed via line 34 to mingle with fresh hydrogen in line 15 to be used in liquid-phase hydrofing zone 4 as previously described. A small portion of recycle gas may be bled off via line 33 to prevent the buildup of inerts in the recycle stream.

The condensed liquid product in separator 30 is then transferred to low-pressure separator 35 via line 36, and level-controlled valve 37. In low-pressure separator 35, off-gases containing mainly methane, ethane, hydrogen sulfide, and hydrogen, are withdrawn via line 39, and the liquid product is withdrawn via line 40 and transferred to final finishing units not shown.

Referring now to Figure 2, the general processing scheme is similar to that in Figure 1 but is modified to permit a greater degree of control over the boiling range of the liquid product which is treated in the second hydrofining zone. In this modification the initial feed is brought in via line 50, mingled with recycle hydrogen from line 51, and transferred via heat exchanger 52, final pre-heater 53, and line 54 into the top of mixed-phase hydrofining reactor 55 containing a bed of hydrofining catalyst 56. The mixed feed passes through catalyst bed 56 and is withdrawn via line 58. The product in line 58 is then passed through heat exchanger 59 to effect cooling to the extent permissible for the subsequent liquid-phase hydrofining. This generally involves a reduction in temperature amounting to between about 20° and 100° F. Normally, there will be an exothermic rise in temperature as the feed passes through reactor 55, and hence the liquid portion is hotter than is optimum for the subsequent liquid-phase hydrofining. The partially condensed mixture is then transferred via line 60 into the top of a separator-reactor 61. The total product is flashed into an open space 62 in the top of reactor 61 where phase separation takes place.

The liquid portion which separates in space 62 trickles downwardly through catalyst bed 63 countercurrently to an ascending stream of preheated hydrogen admitted through line 65. This hydrogen stream preferably comprises the whole of the fresh makeup hydrogen required for the system. The fresh hydrogen is brought in through line 66 in response to valve 70 and pressure controller 71 at a rate sufficient to maintain the system pressure. Any additional hydrogen desired may be added via line 67 from a recycle source hereinafter described. The rising hydrogen stream in reactor 61 serves to keep the liquid phase saturated with hydrogen at the prevailing pressure, and a sufficient excess is present to provide turbulence and to strip out dissolved light hydrocarbons, both those initially present and those formed during hydrofining in reactor 61.

The combined vapors accumulating in space 62 are continuously withdrawn via line 69. The withdrawn vapors are then transferred via line 69, exchanger 73, and condenser 74 into high-pressure separator 75 which is maintained at substantially the pressure prevailing in reactor 61. Recycle gas is withdrawn from separator 75 and transferred via lines 76 and 51 to feed line 50. A portion of the recycle gas may be diverted through line 67 as previously described to supplement the fresh hydrogen admitted to reactor 61 via line 65. A small portion of recycle gas may be bled off via line 77 to prevent the buildup of inerts in the recycle stream.

The liquid product in separator 75 is transferred via line 79 and level-controlled valve 80 into low-pressure separator 81, from which off-gases are withdrawn via line 82. Liquid product is withdrawn via line 83 and transferred to final finishing units not shown.

The liquid product from reactor 61 accumulates in the bottom of the reactor and is withdrawn via line 84 by means of valve 85 operated by liquid-level controller 86. The liquid product in line 84 is then transferred to final fractionation and finishing units not shown.

It will be understood that the temperature, pressures and feed rates in reactors 1, 55 and 61 are substantially within the ranges above described as being generally applicable for hydrofining operations.

The catalysts employed herein may consist of any conventional hydrofining catalyst. In general, the oxides and sulfides of transitional metals are useful, and especially the group VIB and group VIII metal oxides and sulfides. In particular, the combination of one or more group VIB metal oxides or sulfides with one or more of group VIII metal oxides or sulfides is preferred. For example, combinations of nickel-tungsten oxides and/or sulfides, cobalt-molybdenum oxides and/or sulfides, are specifically contemplated. However, iron oxide, iron sulfide, cobalt oxide, cobalt sulfide, nickel oxide, nickel sulfide, chromium oxide, chromium sulfide, molybdenum oxide, molybdenum sulfide, tungsten oxide or tungsten sulfide may be used alone to less advantage.

In all the foregoing cases, it is preferable to support the active catalyst on a relatively inert carrier. Generally, minor proportions of the active metal compounds are used, ranging between about 1% and 25% by weight. Suitable carriers include for example activated alumina, activated alumina-silica, zirconia, titania, activated clays such as bauxite, bentonite and montmorillonite, may be employed. Preferably the active components are added to the carrier by impregnation from aqueous solutions followed by drying and calcining to activate the composition. Suitable calcining temperatures range between about 500° and 1200° C.

The preferred catalyst for use herein comprises the composition usually known as cobalt-molybdate, which actually may be a mixture of cobalt and molybdenum oxides. This mixture is preferably distended upon activated alumina, or still more preferably, activated alumina containing 1% to 15% of coprecipitated silica gel. The atomic ratio of cobalt to molybdenum may be between 0.4 and 5.0, and the total proportion of active ingredients is preferably between about 7% and 22% by weight, comprising about 1%–7% of CoO, and 6%–15% of $MoO_3$. Catalysts of this type may be prepared by coprecipitation of both components on the carrier as described in U.S. Patent No. 2,369,432, and No. 2,325,033, or by co-impregnation of both components on the carrier as described in U.S. Patent No. 2,486,361. Preferably however they are prepared by separate alternate impregnations as described in U.S. Patent No. 2,687,381.

The catalysts employed in the various hydrofining zones described herein may be identical, or they may be different. However, since all of the hydrofining operations herein described include a substantial liquid-phase reactant, it is preferable to use catalysts best adapted for the treatment of liquid phases. In general, for liquid-phase treatment it is desirable to use catalysts containing higher proportions of active ingredients than where wholly vapor-phase operations are concerned. In vapor-phase processing with $CoO$—$MoO_3$ catalysts, the degree of conversion obtainable under a given set of conditions appears to level off when the cobalt oxide content reaches about 3% by weight. However, when a liquid phase is present it is found that substantially increased conversions are obtainable proportionate to cobalt oxide contents ranging up to about 7%, the $MoO_3$ content remaining constant at about 10%. It is therefore preferred, in the case of cobalt-molybdate catalysts, to use those containing between about 3–7% of cobalt oxide and 6–15% of molybdenum oxide. The same preferred ranges apply where other group VIII metals are substituted for cobalt, and other group VIB metals for molybdenum.

Typical results obtainable in practice of the present invention are illustrated by the following examples. These examples however should not be construed as limiting in scope.

*Example 1*

It is desired to hydrofine a gas oil feed which is high in both sulfur and nitrogen. It is desired to use the light fraction from this feed and the light ends produced during hydrofining as feedstock to a pre-existing desulfurizing-reforming unit. The heavy fraction is to be used as feedstock to a fluid catalytic cracking unit, and not more than about 0.15% nitrogen can be tolerated therein. In order to achieve the desired hydrofining of both fractions, a processing scheme similar to that shown in Figure 1 is used. The catalyst employed in catalyst beds 3 and 4 is a 3% cobalt oxide–9% molybdenum oxide composite supported on a 95% alumina–5% silica carrier. Hydrofining in zone 3 is carried out with 2000 s.c.f. of recycle hydrogen per barrel of total feed, and processing in zone 4 is carried out in countercurrent flow with 930 s.c.f. of fresh hydrogen and 310 s.c.f. of recycle hydrogen per barrel of total initial feed. The details of operating conditions, feed and product characteristics are as follows:

|  | Zone 3 | Zone 4 |
|---|---|---|
| Feed: |  |  |
|   Gravity, ° API | 25.0 | 24.0 |
|   Boiling range, °F | 400–800 | 520–750 |
|   Sulfur, wt. percent | 2.5 | 0.15 |
|   Nitrogen, wt. percent | 0.3 | 0.22 |
| Product: |  |  |
|   Gravity, ° API | 38.0 | 28.0 |
|   Boiling range, ° F | 100–620 | 400–700 |
|   Sulfur | 0.05 | 0.07 |
|   Nitrogen | 0.08 | 0.10 |
|   Vol. percent of original feed | 58.0 | 45.0 |
| Reactor Operating Conditions: |  |  |
|   Temp.— |  |  |
|     In, ° F |  |  |
|     Out, ° F | 700 | 760 |
|  | 760 | 780 |
|   Pressure, |  |  |
|     In, p.s.i.g | 1100 | 1090 |
|     Out, p.s.i.g | 1090 | 1080 |
|   Hydrogen to oil ratio, s.c.f./bbl | 2000 | 1240 |
|   Hydrogen consumption, s.c.f./bbl | 720 | 210 |
|   Liquid hourly space velocity | 2.0 | 1.5 |

It will thus be apparent that the vapor-phase product from zone 3 is suitable in quality for use in the desulfurizer-reforming unit. The liquid-phase product from zone 3 is too high in nitrogen for use as catalytic cracking charge stock, but the product from zone 4 is sufficiently reduced in nitrogen and sulfur for such use. The procedure of this example is particularly useful for treating oils having an initial boiling point between about 350°–450° F., and an end boiling point between about 750–850° F.

*Example II*

The procedure of Example I is repeated except that the catalyst used in zones 3 and 4 is modified to contain about 6% of CoO by weight. The respective products are found to contain about 15% less nitrogen and about 10% less sulfur, as compared to the products of Example I.

*Example III*

In Example I, it was necessary to fractionate the vapor-phase product recovered from zone 3 in order to separate a 200°–450° F. naphtha. By adopting the processing sequence shown in Figure 2, and reducing the temperature of the total effluent from reactor 55 from 760° F. to 690° F., the boiling range of the vapor-phase product withdrawn through line 69 is found to be about 100°–480° F., and hence may be used directly in the desulfurizer-reformer unit without prefractionation.

Results similar to those described in the examples are obtained when other catalysts within the scope of this invention are substituted for the cobalt-molybdate. Similarly, other processing conditions may be employed to obtain commensurate benefits. The scope of the invention should not be construed as limited to the exemplary details. The true scope of the invention is intended to be embraced by the following claims.

We claim:

1. In a process wherein a mineral oil feedstock having an end-boiling-point above about 500° F. and an initial-boiling-point at least 75° F. lower than said end-boiling-point is subjected to mixed-phase hydrofining at an elevated pressure in the presence of hydrogen and a catalyst, and wherein the conditions of hydrofining are such that a portion of said feedstock is in the vapor-phase and another portion is in the liquid phase, the improvement which comprises (1) terminating said mixed-phase contacting after said vapor-phase has been sufficiently treated to decompose a substantial desired proportion of organic impurities therein but before said liquid-phase has been sufficiently treated to effect removal therefrom of the desired proportion of organic impurities, (2) separating the total vapor-phase product from the liquid-phase product at substantially the pressure prevailing in said mixed-phase hydrofining, (3) subjecting said liquid-phase product to further hydrofining at an elevated pressure in the presence of a hydrofining catalyst but in the absence of said vapor-phase to effect further removal of organic impurities therefrom, (4) countercurrently stripping said liquid-phase during hydrofining with a stream of hydrogen at substantially the pressure prevailing in said mixed-phase hydrofining to strip dissolved low boiling hydrocarbons therefrom, (5) mixing said separated vapor-phase product with the vapor phase stripping effluent from said stripping step, and (6) condensing and recovering hydrocarbons from the mixed vapor phases of step (5).

2. A process as defined in claim 1 wherein said liquid-phase hydrofining is carried out in countercurrent flow with a stream of fresh hydrogen at substantially the pressure prevailing in said mixed-phase hydrofining, and the total vapor effluent from said liquid-phase hydrofining is included with said vapor-phase product.

3. A process as defined in claim 1 wherein the vapor-phase product from said mixed-phase hydrofining in admixture with the vapor effluent from said liquid-phase stripping are cooled and condensed without substantial reduction in pressure, and the resulting hydrogen-rich gas phase is recycled to said mixed-phase hydrofining.

4. A process as defined in claim 1 wherein the catalysts employed for said mixed-phase hydrofining and said liquid-phase hydrofining comprise two active components in intimate admixture, one of said components being selected from the class consisting of the oxides and sulfides of group VIB metals, and the other of said components being selected from the class consisting of the oxides and sulfides of group VIII metals.

5. A process as defined in claim 1 wherein the catalysts employed in said mixed-phase hydrofining and said liquid-phase hydrofining consist essentially of cobalt molybdate distended on a major proportion of an adsorbent oxide carrier.

6. A process as defined in claim 1 wherein the catalysts employed in said mixed-phase hydrofining and said liquid-phase hydrofining consist essentially of cobalt molybdate on alumina, wherein the cobalt oxide content is between about 1% and 7% by weight and the molybdenum oxide content is between about 6% and 15% by weight.

7. A process as defined in claim 1 wherein the total effluent from said mixed-phase hydrofining is partially cooled to effect a partial condensation of the vapor phase prior to said separation of vapor phase from liquid phase.

8. A method for hydrofining a gas oil feedstock having an initial boiling point between about 350–450° F. and an end boiling point between about 750–850° F., to obtain therefrom a light fraction suitable for use as reforming charge stock and a heavy fraction suitable for use as catalytic cracking charge stock, which comprises first subjecting said feedstock to mixed-phase hydrofining in the presence of hydrogen and a catalyst, wherein the conditions of hydrofining at an elevated pressure are such that the heavy ends are predominantly in the liquid phase and the light ends are predominantly in the vapor phase, both of said phases being in concurrent downflow while in contact with said catalyst, terminating said mixed-phase contacting after said vapor phase has been sufficiently refined for use as reforming charge stock but before said liquid phase has been sufficiently refined for use as cracking charge stock, separating the total vapor-phase product from the liquid-phase product at substantially the pressure prevailing in said mixed-phase hydrofining, subjecting said liquid-phase product to further catalytic hydrofining and stripping countercurrently to a stream of fresh hydrogen to strip dissolved low-boiling hydrocarbons therefrom, combining the total vapor effluent from said liquid-phase hydrofining and stripping with the vapor-phase product from said mixed-phase hydrofining, recovering from said combined vapor phases a light fraction suitable for use as reforming charge-stock, and recovering from said liquid-phase hydrofining a heavy fraction suitable for use as catalytic cracking charge stock.

9. A process as defined in claim 8 wherein the total effluent from said mixed-phase hydrofining is partially cooled to effect a partial condensation of the vapor phase prior to said separation of vapor phase from liquid phase.

10. A process as defined in claim 8 wherein the catalysts employed in said mixed-phase hydrofining and said liquid-phase hydrofining consist essentially of cobalt molybdate distended on a major proportion of an adsorbent oxide carrier.

References Cited in the file of this patent

UNITED STATES PATENTS

| | | |
|---|---|---|
| 2,671,754 | De Rosset et al. | Mar. 9, 1954 |
| 2,769,754 | Sweetser et al. | Nov. 6, 1956 |

UNITED STATES PATENT OFFICE
CERTIFICATE OF CORRECTION

Patent No. 2,952,626                                September 13, 1960

Arnold E. Kelley et al.

It is hereby certified that error appears in the printed specification of the above numbered patent requiring correction and that the said Letters Patent should read as corrected below.

Column 7, line 62, strike out the entire claim beginning with "2. A process as defined in claim 1" and ending with "vapor-phase product." in line 67, same column; the claims 3 through 10 should be renumbered 2 through 9; column 8, line 35, strike out "at an elevated pressure" and insert the same after "hydrofining" in line 33; same column 8, lines 56 and 60, for the claim reference numeral "8", each occurrence, read -- 7 --; in the heading to the printed specification, line 9, for "10 Claims." read -- 9 Claims. --.

Signed and sealed this 11th day of April 1961.

(SEAL)
Attest:

ERNEST W. SWIDER
Attesting Officer

ARTHUR W. CROCKER
                                               Acting Commissioner of Patents